United States Patent
Sekine et al.

[11] Patent Number: 5,861,916
[45] Date of Patent: *Jan. 19, 1999

[54] APPARATUS FOR DETECTING MOVEMENT USING A DIFFERENCE BETWEEN FIRST AND SECOND IMAGE SIGNALS

[75] Inventors: Masayoshi Sekine, Tokyo; Toshiaki Kondo, Atsugi, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 708,740

[22] Filed: Sep. 5, 1996

Related U.S. Application Data

[63] Continuation of Ser. No. 231,972, Apr. 21, 1994, Pat. No. 5,579,045, which is a continuation of Ser. No. 50,729, Dec. 21, 1992, abandoned, which is a continuation of Ser. No. 798,946, Nov. 27, 1991, abandoned.

[30] Foreign Application Priority Data

Nov. 30, 1990 [JP] Japan ................................ 2-333839

[51] Int. Cl.⁶ .................................................. H04N 5/232
[52] U.S. Cl. ............................................. 348/208; 348/699
[58] Field of Search .................................... 348/208, 699, 348/700, 701; 396/55

[56] References Cited

U.S. PATENT DOCUMENTS

| | | |
|---|---|---|
| 3,603,725 | 9/1971 | Cutler . |
| 3,890,462 | 6/1975 | Limb et al. . |
| 4,218,703 | 8/1980 | Netravali et al. ...................... 348/699 |
| 4,270,143 | 5/1981 | Morris . |
| 4,788,596 | 11/1988 | Kawakami et al. . |
| 4,884,136 | 11/1989 | Ninomiya et al. . |
| 4,939,685 | 7/1990 | Feintuch . |
| 5,012,270 | 4/1991 | Sekine et al. . |
| 5,031,049 | 7/1991 | Toyama et al. . |
| 5,047,850 | 9/1991 | Ishii et al. . |
| 5,107,293 | 4/1992 | Sekine et al. . |
| 5,128,768 | 7/1992 | Suda et al. . |
| 5,164,835 | 11/1992 | Yamada et al. . |
| 5,172,226 | 12/1992 | Morimura et al. ...................... 348/699 |
| 5,181,109 | 1/1993 | Kang et al. ............................. 348/701 |
| 5,198,896 | 3/1993 | Kondo et al. . |
| 5,210,559 | 5/1993 | Ohki ........................................ 348/208 |
| 5,389,918 | 2/1995 | Kusaka et al. .......................... 348/699 |
| 5,452,021 | 9/1995 | Kusaka et al. .......................... 348/699 |
| 5,579,045 | 11/1996 | Sekine et al. ........................... 348/208 |
| 5,699,128 | 12/1997 | Hayashi ................................... 348/699 |

FOREIGN PATENT DOCUMENTS

| | | |
|---|---|---|
| 0177763 | 4/1986 | European Pat. Off. . |
| 1178916 | 7/1989 | Japan . |

*Primary Examiner*—Wendy Garber
*Attorney, Agent, or Firm*—Fitzpatrick, Cella, Harper & Scinto

[57] ABSTRACT

A movement detection apparatus comprises a first circuit for detecting a difference signal between first and second image signals, a second circuit for integrating the difference signal detected by the first circuit, a third circuit for detecting respective image signal levels of the first and second image signals when the image signals reach a predetermined level, a fourth circuit for detecting a difference signal of plural detection results given by the third circuit, and a fifth circuit for dividing the second circuit output signal by the fourth circuit output signal to detect a signal corresponding to image movement.

13 Claims, 8 Drawing Sheets

APPARATUS FOR DETECTING MOVEMENT USING A DIFFERENCE BETWEEN FIRST AND SECOND IMAGE SIGNALS

This application is a continuation of application Ser. No. 08/231,972 filed Apr. 21, 1994 now U.S. Pat. No. 5,579,045, which is a continuation of application Ser. No. 08/050,729, filed Dec. 21, 1992 (now abandoned), which is a continuation of application Ser. No. 07/798,946, filed Nov. 27, 1991 (now abandoned).

BACKGROUND OF THE INVENTION

1. Field of the Invention

The present invention is related to a movement detection apparatus suitably applicable to remote sensing by a TV camera, a moving image compression apparatus, a vibration-proof camera for correcting a vibratory motion of camera, etc.

2. Related Background Art

There are various methods and means for detecting movement of camera or subject. An example of movement vector detection apparatus using an image is described in U.S. Pat. No. 3,890,462.

That patent discloses a method in which a luminance difference or interframe difference is obtained at a pixel from two sequential images, a space gradient is computed in a frame, and a movement amount is gained by division of the gradients per block.

The following formulae explain the above operation, where $\alpha$ stands for a movement amount in the x-direction and $\beta$ for that in the y-direction.

$$\alpha = \left( \sum_b d \right) / \left( \sum_b g_x' \right), \quad (1)$$

$$\beta = \left( \sum_b d \right) / \left( \sum_b g_y' \right). \quad (2)$$

In the formulae, b represents an operation block size and g(F, x, y) an image. A character F denotes a frame number and d a difference between two frames or a interframe difference. Space gradients are defined by $\partial g/\partial x = g_x'$ and $\partial g/\partial y = g_y'$.

This movement vector detection method has a problem in that the detection range of the movement amount is small, causing an extremely big detection error upon detection of a great movement amount. That is, a quick motion cannot be detected using a TV signal of a fixed frame rate.

Figure 1:
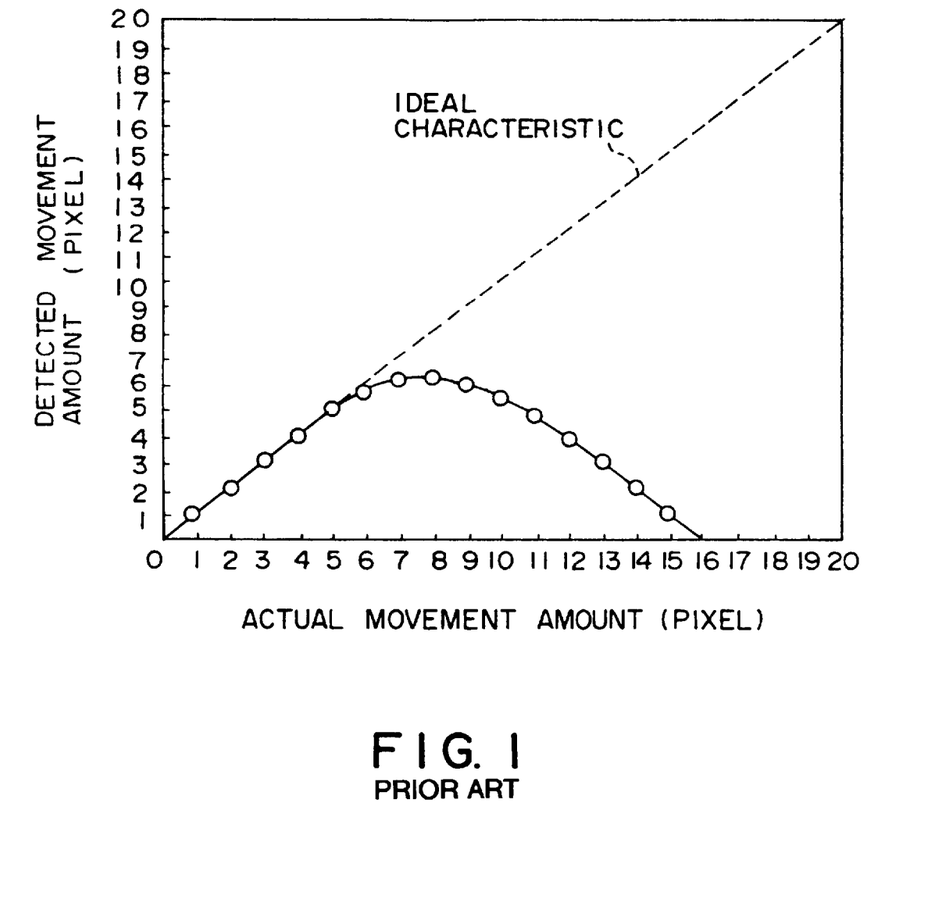
FIG. 1 is a diagram to show a movement detection property of a conventional movement detection apparatus.

FIG. 1 shows a simulation result of the movement detection operation applying the conventional method to an actual image.

The simulation assumptions are that a screen is composed of 512×512 pixels, and that a striped black and white pattern of 32 pixel period is photographed by a lens diameter of ten pixel circle of least confusion. A block size for the operation is 25 pixels.

As seen in FIG. 1, accurate detection of the movement amount is restricted within the actual movement of four to five pixels. Beyond the five pixel movement, the detection accuracy decreases so that detection values get away from the ideal characteristics. Moreover, in case that the actual movement amount is over eight pixels, the detection value becomes reduced. For example, at the twelve pixel actual movement, the detection value is about four pixels, which cannot be distinguished from the actual movement of four pixels.

Since the detection value becomes smaller upon greater actual movement, this apparatus shows a further greater detection error when calculating an acceleration or a difference per unit time between two movement amounts.

The detection range may be normalized by the pattern period $\lambda$ of a subject. An accurately detectable range is between $\lambda/4$ and $\lambda/6$, presenting a theoretical limit of performance of the conventional method.

Below are listed prior applications and patents of the present applicant concerning apparatus detecting movement like in the present invention.

| Application or Patent | Application date |
| --- | --- |
| U.S. Pat. No. 4788596 | |
| Japanese Patent Appln. Laid-open No. 1-178916 | |
| U.S. Ser. No. 880152 | 6/30/86 |
| U.S. Ser. No. 154078 | 2/9/88 |
| U.S. Pat. Nos. 5031049 5,198,896; 4,939,685; 5,012,270; 5,107,293; 5,164,385; and 5,128,768 | |

SUMMARY OF THE INVENTION

The present invention has a purpose to solve the above-described problem, providing a movement detection apparatus with a simple hardware structure, a wide movement detection range, and a high detection precision.

According to a preferred embodiment of the present invention to attain the purpose, there is disclosed a movement detection apparatus comprising first means for detecting a difference signal between first and second image signals, second means for integrating the difference signal detected by said first means, third means for detecting respective image signal levels of said first and second image signals when the image signals reach a predetermined level, fourth means for detecting a difference signal of plural detection results given by said third means, and fifth means for dividing said second means output signal by said fourth means output signal to detect a signal corresponding to image movement.

Another purpose of the invention is to provide a video camera with a movement detection apparatus realizing a wide movement detection range and a high detection precision.

According to another preferred embodiment of the present invention to attain the purpose, there is disclosed a movement detection apparatus comprising image pickup means for converting an optical image into an electric signal to output an image signal, first operation means for outputting a difference signal between first and second image signals output by said image pickup means at different times, detection means for detecting an image signal level when said first and second image signals reach an identical level, second operation means for operating a difference signal of plural detection results given by said detection means, and third operation means for effecting predetermined a operation on output signals of said first and second operation means to output a signal corresponding to image movement.

Still another purpose of the present invention is to provide a video camera apparatus with the above movement detection apparatus.

Other purposes and specific features of the present invention will be clarified by the following details and drawings.

DETAILED DESCRIPTION OF PREFERRED EMBODIMENTS

A movement detection apparatus of the present invention is described below with references to preferred embodiments thereof and accompanying drawings.

Figure 2:
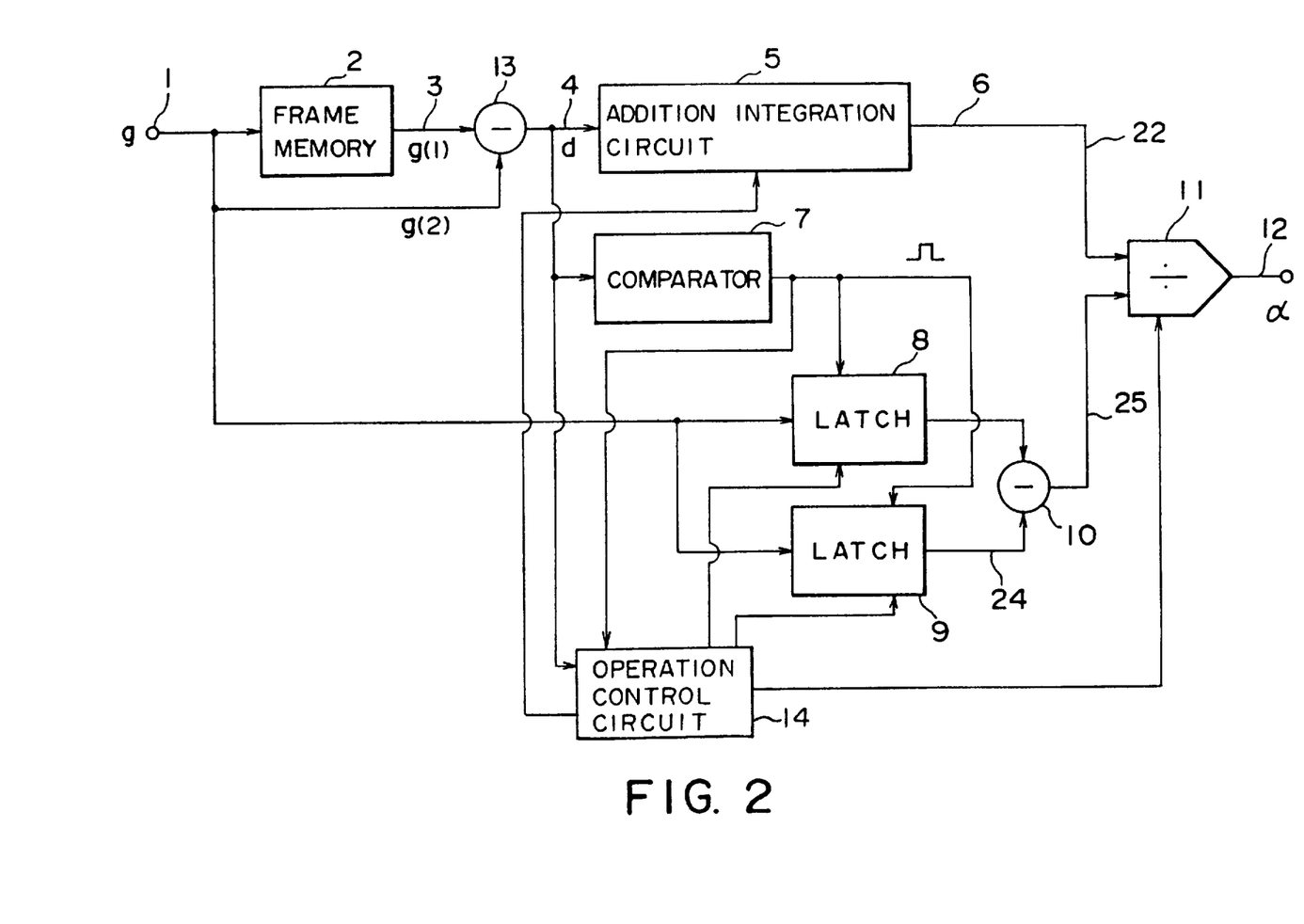
FIG. 2 is a block diagram to show a structure of a movement detection apparatus of the present invention.

FIG. 2 is a block diagram to show a structure of the movement detection apparatus of an embodiment of the present invention.

In FIG. 2, 1 denotes an image signal output by a camera system comprising an image pickup element, 2 a frame memory to store the image, 3 an image output signal read out of the frame memory 2, 13 a subtraction circuit to compute a difference between the image signal read out of the frame memory 2 and the present image signal, 4 a luminance difference signal output from the subtraction circuit 13, 5 an integration circuit to integrate the input signal thereinto, 6 an output signal of the integration circuit, 7 a comparator, 8, 9 latch circuits to latch a luminance signal, 10 a subtraction circuit to compute a difference between the outputs of the latch circuits 8, 9, 11 a division circuit to perform a division of the outputs of the integration circuit 5 and of the subtraction circuit 10, 12 a movement detection signal output from the division circuit 11, and 14 an operation control the circuit to control latch operation in the latch circuits 8, 9 based on the output of the comparator 7 and the luminance difference signal 4, and to control the reset operation of the integration circuit and other operations.

The frame memory 2 stores the image during a determined frame time. The subtraction circuit 13 effects the subtraction between the delayed signal 1, $g_{(1)}$, stored in the frame memory 2 and the present signal 2, $g_{(2)}$, to obtain the luminance difference signal 4.

FIGS. 3A–3D are operation explanatory drawings of the present apparatus, where the luminance signals only of an x-directional scan line are shown for convenience of explanation. In the drawings, signals 1, 3, 4, 6 correspond to those in FIG. 2.

Figure 3A:
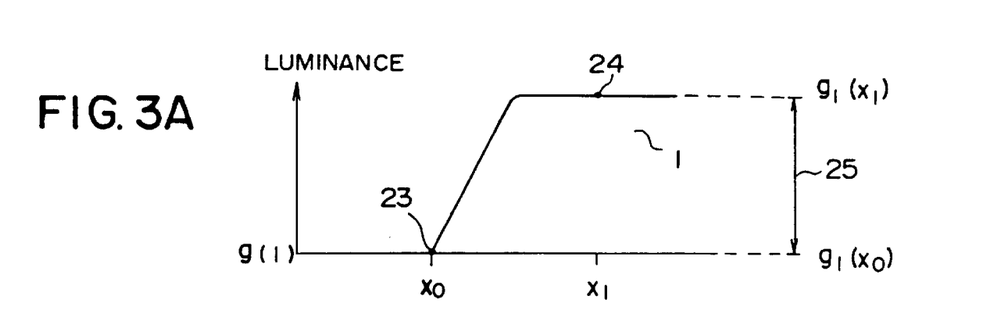
FIGS. 3A to 3D are drawings to illustrate a theory to detect a movement amount by the apparatus of the present invention.

FIG. 3A shows the signal 1, $g_{(1)}$, the right edge of which has a great luminance.

Figure 3B:
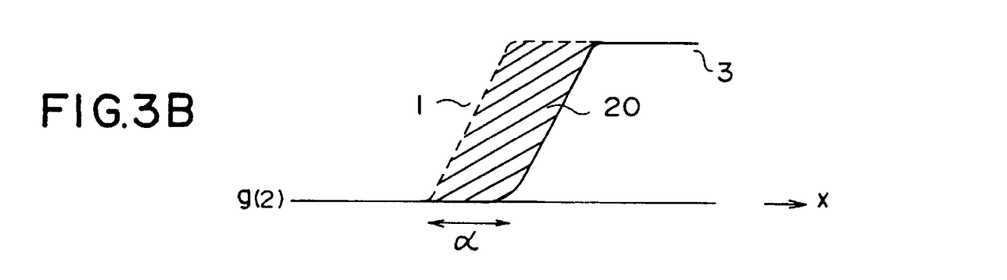

FIG. 3B shows the signal 2, $g_{(2)}$, the edge of which moved to the right.

In case of such edge movement, the superposed signals 1, 3 show the hatched region 20 corresponding to a change caused by the movement. Assuming that the region 20 is a parallelogram, the movement amount α corresponds to the base of the parallelogram. The movement amount α will be obtained by dividing the area of the region 20 by the height of the edge.

The movement detection apparatus of the present invention determines the movement amount based on the above theory.

In order to electrically obtain the area of the region 20, the luminance difference signal 4 is used, which is gained by subtraction of $g_{(1)}$ and $g_{(2)}$ at the subtraction circuit 13.

Figure 3C:
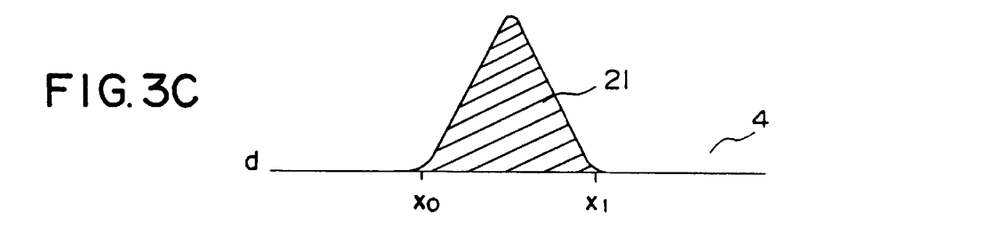
Figure 3D:
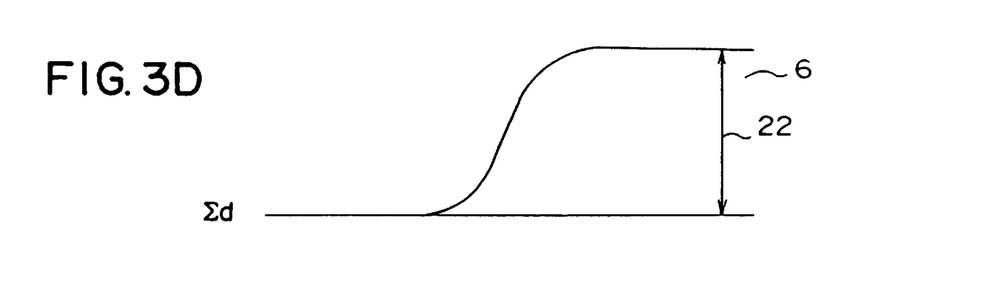

The luminance difference signal 4, as shown in FIG. 3C, is an electric signal of triangle or trapezoid shape, the area 21 of which is equal to that of the region 20. Then the luminance difference signal 4 is input into the integration circuit 5 for integration thereof, to obtain the signal 6 as shown in FIG. 3D. The signal 22 obtained is proportional to the area of the region 21.

Further, to obtain the edge height, a boundary is noted where the level of the luminance difference signal 4 becomes zero.

In FIGS. 3A–3D, $x_0$ is a point where the luminance difference signal 4 leaves zero and $x_1$ a point where it returns to zero. The luminance signals at those positions $x_0$, $x_1$, are detected.

Actually in FIG. 2, the luminance signals at $x_0$ and $x_1$ are so obtained that the latch circuits 8, 9 are operated at respective timings when the comparator 7 detects the zero points of the luminance difference signal 4, and so that the latch circuits 8, 9 latch the respective luminance signal levels at the zero points.

In detail, the comparator 7 detects a pixel which has the zero luminance difference signal, to generate a pulse, and the latch circuits 8, 9 store the luminance signal data of the image signal 1 in response to the pulse. Upon the latch, the latch circuits 8, 9 do not store the data of the identical pixel. The operation control circuit 14 controls the circuits 8, 9 so that they store the data at the ascending edge and the descending edge of the signal 4 discriminating them. In FIG. 2 the output luminance signals from the latch circuit 8, 9 are represented by 23, 24.

The subtraction circuit 10 computes a difference between the luminance signals 23, 24 to obtain the edge height of the signal 1. The signal is shown as 25 in FIG. 2. The dividing circuit 11 divides the signal value 22 by the signal value 25 to gain the movement signal 12 corresponding to the edge movement amount α as shown in FIG. 3B. At the same time, the operation control circuit 14 resets the integration circuit 5.

The above description refers only to the movement detection in the x-direction. A similar method is, however, applicable to the y-direction movement detection, for example, if the image stored in memory is vertically scanned for the read-out.

FIG. 3 illustrates an example of only one edge. Although actual images have more complex pattern, the apparatus of the present invention can detect the movement amount of such an actual image similarly.

Figure 4A:
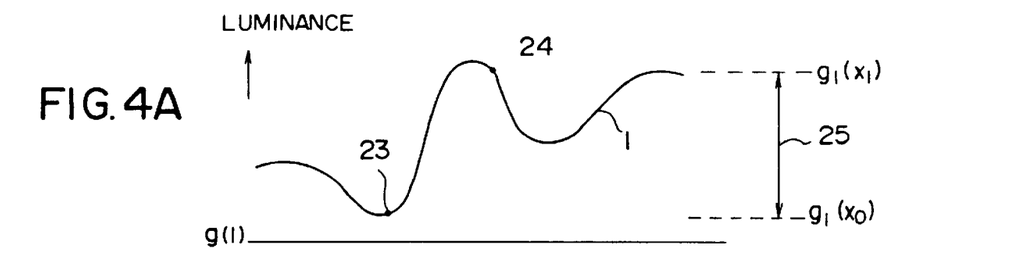
FIGS. 4A to 4D are drawings to illustrate another theory to detect a movement amount by the apparatus of the present invention.
Figure 4B:
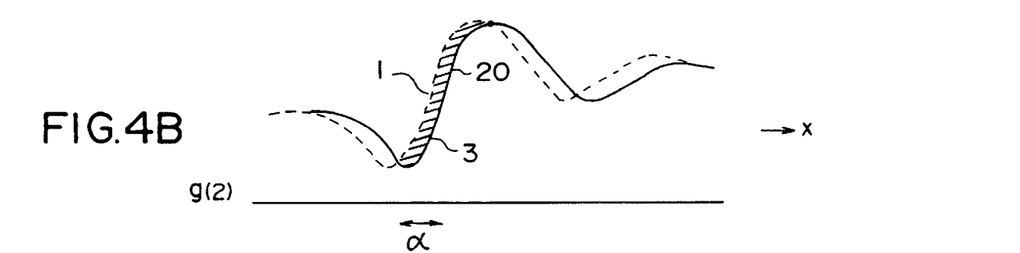

FIGS. 4A–4D show signal conditions of such an image. FIG. 4A shows a wave shape of an image signal or luminance signal, and FIG. 4B a present image signal 1 and an image signal 3 delayed by a determined time by the frame memory 2. In FIG. 4B the image signal shifts right by the amount α, so that a region 20 is formed like a waved parallelogram. FIG. C shows a wave shape of a luminance difference output from the subtraction circuit 13, and FIG. 4D that of integration output from the intergration circuit 5.

The region 20 of the thus-deformed parallelogram as in FIG. 4B may be approximated by a parallelogram if the movement amount α is small enough compared with a period λ of image. Then the above-described method provides an accurate movement amount α.

Since the integration circuit 5 is reset for each pulse of the comparator by the operation control circuit 14, the movement amount of the watching edge is detected accurately.

Figure 5:
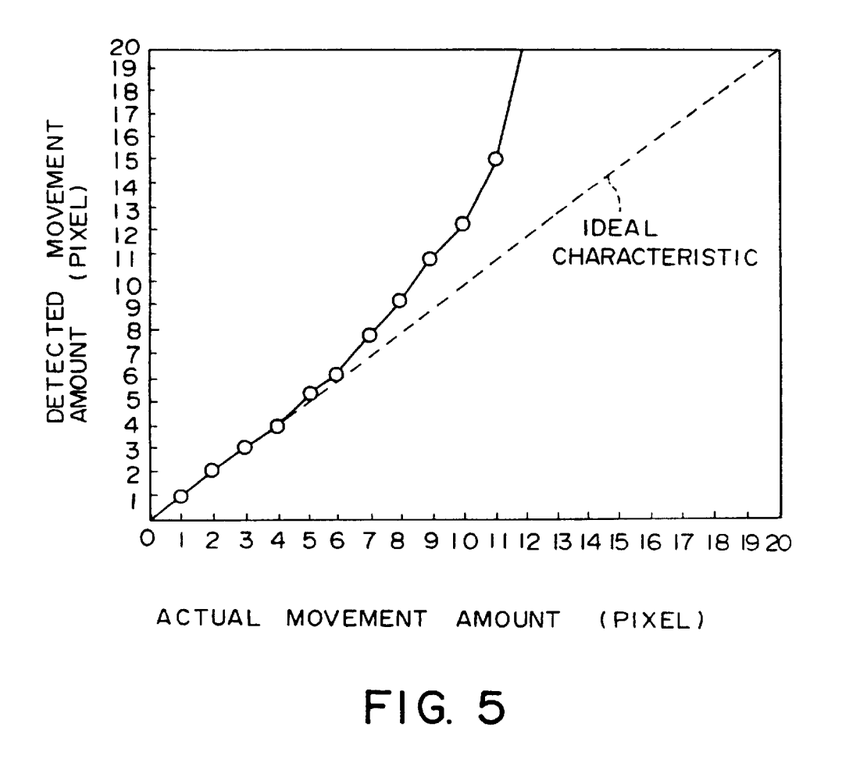
FIG. 5 is a diagram to show a movement detection property of the apparatus of the present invention.

In case of further greater movement, the geometrical approximation to the parallelogram will be difficult to apply. FIG. 5 shows a simulation result using an actual image to show the limit. The conditions of calculation are the same as the conventional example as explained referring to FIG. 1.

According to a simulation, the detection using the present apparatus shows less detection errors, for example, twelve pixels of detection for ten pixels of actual movement against five pixels of detection therefor by the conventional method.

Also, while the conventional method revealed the extreme errors upon detection of acceleration for the movement amount over a quarter of the subject pattern period λ due to the tendency to reduce the detected value, the above-detailed apparatus of the present invention remarkably improves the errors.

Furthermore, if the subject size, the pattern period, and the circle of least confusion are known, the curve of FIG. 5 is uniquely determined. Storing the curve in a ROM table and adjusting the detection properties leads to further improvement of detection precision.

In the above example of an image, the accurate detection can be attained within one pixel error up to twelve pixels or three eighths of the subject pattern period λ even if considering calculation errors.

As explained above, the movement apparatus of the present invention achieved a great improvement in detection properties compared with the conventional apparatus.

Figure 6:
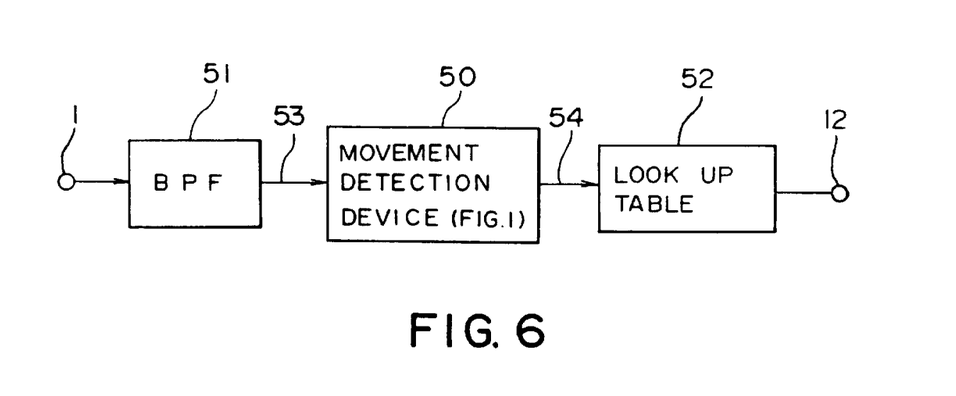
FIG. 6 is a block diagram to show another embodiment of the movement detection apparatus of the present invention.

FIG. 6 shows another embodiment of movement detection apparatus of the present invention with further modifications. The apparatus of this embodiment allows the detection of the movement amount with high precision without knowing the pattern size of the subject.

In FIG. 6, 50 denotes the movement detection apparatus of the first embodiment as shown in FIG. 2, 51 an image band pass filter as is abbreviated hereinafter as BPF, 52 a lookup table as is abbreviated hereinafter as LUT, 53 an output signal of BPF 51, and 54 an output signal of the movement detection apparatus 50. As explained before, the apparatus 50 of the present invention has a close relation between the space gradient of the image and the detection range. Conversely, if a necessary detection range is determined, a suitable space gradient is also determined. This apparatus extracts only necessary component of space frequency using BPF 51 in the case of an unknown pattern size of subject.

Setting α' as a maximum of the movement amount to be obtained, the space frequency f to be extracted is given by the following:

$$f = 1/\lambda = k \cdot 1/\alpha' \ldots (3)$$

The value of k is preferably about ⅜.

The BPF 51 must be a two-dimensional filter when detecting both the movement amounts in the x- and y-directions. It is preferable that the phase property of BPF 51 be nearly linear in the band area of the pass.

Figure 7:
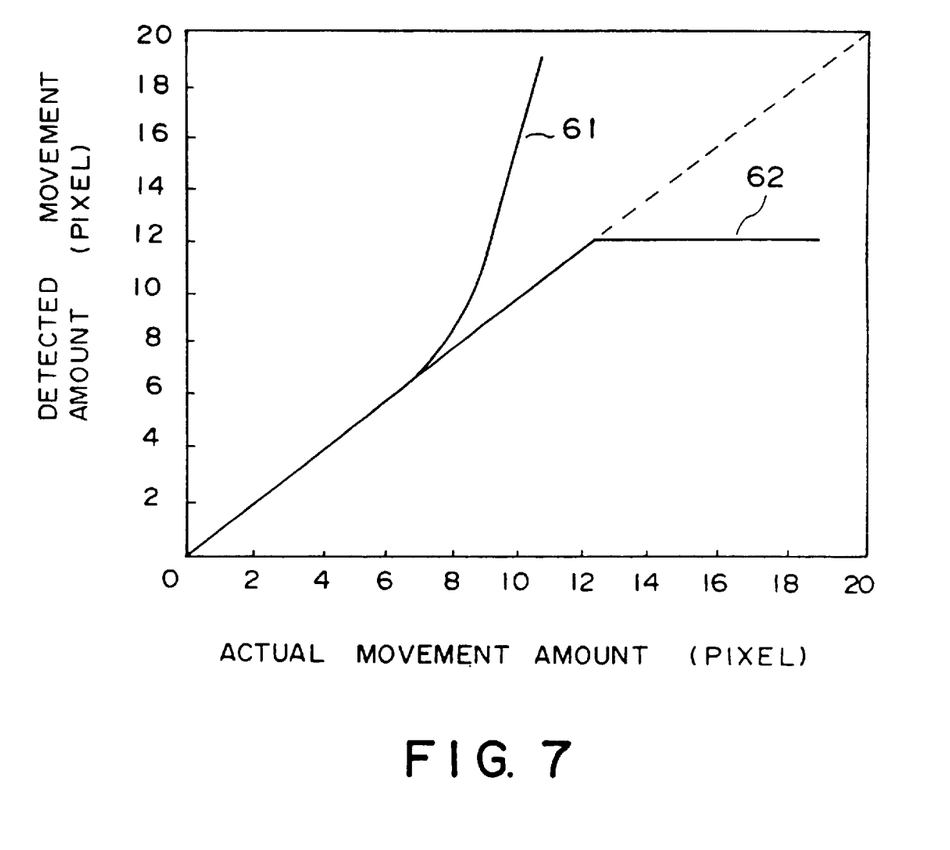
FIG. 7 is a drawing to show a movement detection property of the apparatus as shown in FIG. 6.

The operation of LUT 52 is as follows. If a single frequency of signal 53 is extracted, the detection property of the apparatus 50 is uniquely determined. A curve 61 in FIG. 7 shows a detection property after BPF processing with λ=32 pixels. LUT 52 has a reciprocal number of the coefficient of the curve 61 to correct the curve into a line. A curve 62 in FIG. 7 shows the detection property after the correction. The output over a determined detection value is clipped in this embodiment.

The detection property may be linearized using LUT 52 as explained. Also a non-linear detection property may be employed for some uses.

The movement detection apparatus of the present invention is arranged as explained. Explained next is an embodiment in which the movement detection apparatus is applied to a vibration correction device of a video camera.

Figure 8:
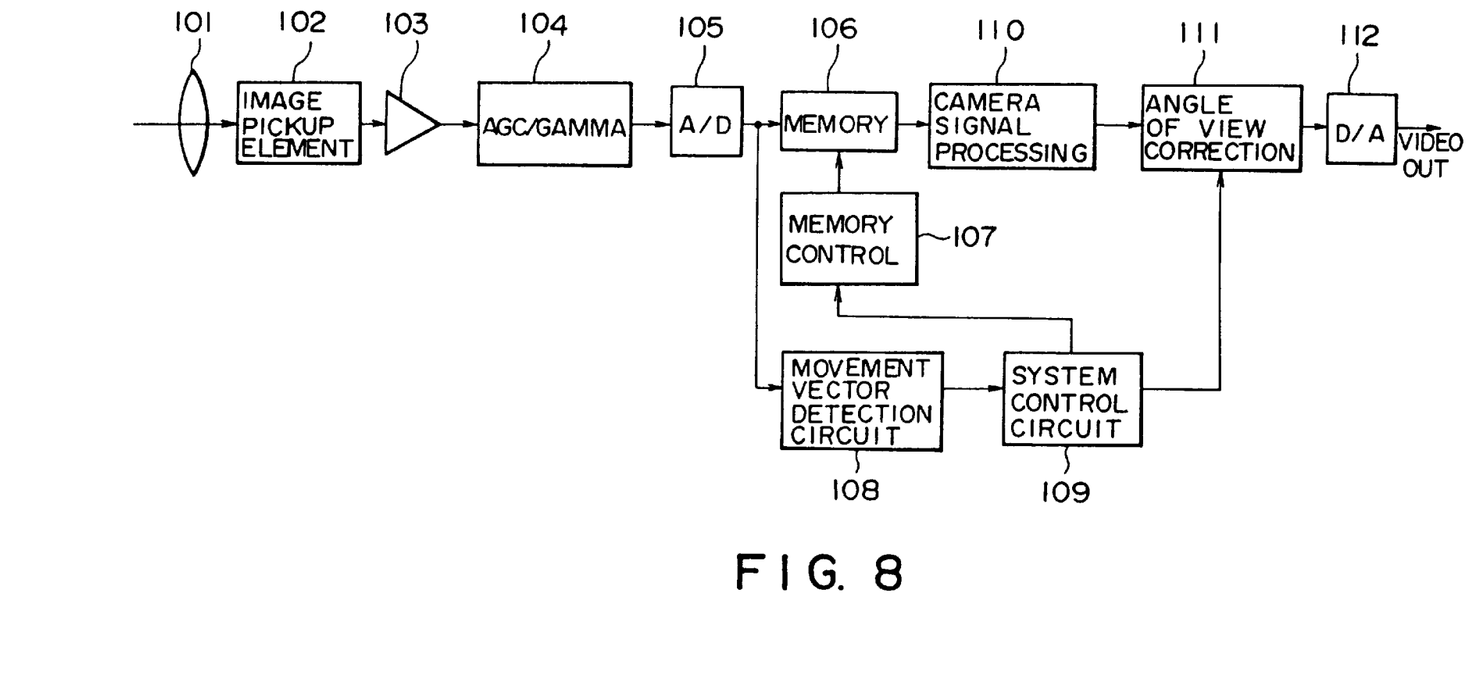
FIG. 8 is a block diagram to show the first example in which the movement detection apparatus of the present invention is applied to a vibration correction apparatus of a video camera.

FIG. 8 depicts a block diagram to show the third embodiment in which the movement vector detection apparatus of the present invention is used for a vibration correction device of a video camera.

In FIG. 8, 101 is a photographing lens optical system, 102 an image pickup element such as a CCD or the like to output a photoelectrically-converted image signals of a subject image focused on an image pickup screen by the optical system 101, 103 a preamplifier to amplify the image signal output from the image pickup element 102 up to a determined level, 104 a preliminary processing circuit to apply AGC to the input image signal to hold a constant level thereof and to effect processing of gamma control and others, 105 an A/D converter to convert the input analog image signal into a digital image signal, 106 an image memory to store one field of the digital image signal output from the A/D converter 105, and 107 a memory control circuit to control an address and a write-in rate upon reading the image into the image memory and to control a read-out address and a read-out rate of the image upon reading the image out of the image memory 106. The memory control circuit is controlled by a system control circuit 109 as explained later.

Number 108 denotes a movement vector detection circuit to detect the movement vector of the image from the image signal, the inner structure and the operation of which are similar to; and those in the circuit as shown in FIGS. 2 and 4 and, needless to say, effect the digital signal processing.

Number 109 is the system control circuit, comprising a microcomputer, to totally control the present apparatus, to compute vibration correction information from the movement vector information operated in the movement detection circuit 108, to control the memory control circuit 107 based on the above operation result, and to shift, upon reading the image out of the memory 106, the read-out position or read-out address on the memory in the direction of vibratory motion to kill the vibratory motion.

Number 110 is a camera signal processing circuit to effect determined signal processing on the read-out image signal from the memory 106 to convert the signal into a normalized image signal, and 111 an angle-of-view correction circuit, being controlled by the system control circuit, to correct an angle of view of the image read out of the memory 106. In detail, the vibration correction is attained by shifting the read-out position of the image on the memory, so that the read-out image has a smaller angle of view by the shift range in the memory than the input image read into the memory. Then the angle-of-view correction circuit 111 effects magnification of angle of view and compensation of the image so that the image has the same angle of view as one before the vibration correction.

The signal after the view angle correction is converted into an analog image signal by a D/A converter 112, and then supplied to an unshown monitor of a video recorder, electronic view finder or the like.

By the above arrangement, the vibration correction is attained so that the amount of vibratory motion is detected by obtaining the movement vector using the embodiments as shown in FIGS. 2 and 6, and then so that the read-out address is shifted in the direction to kill the vibration amount.

Figure 9:
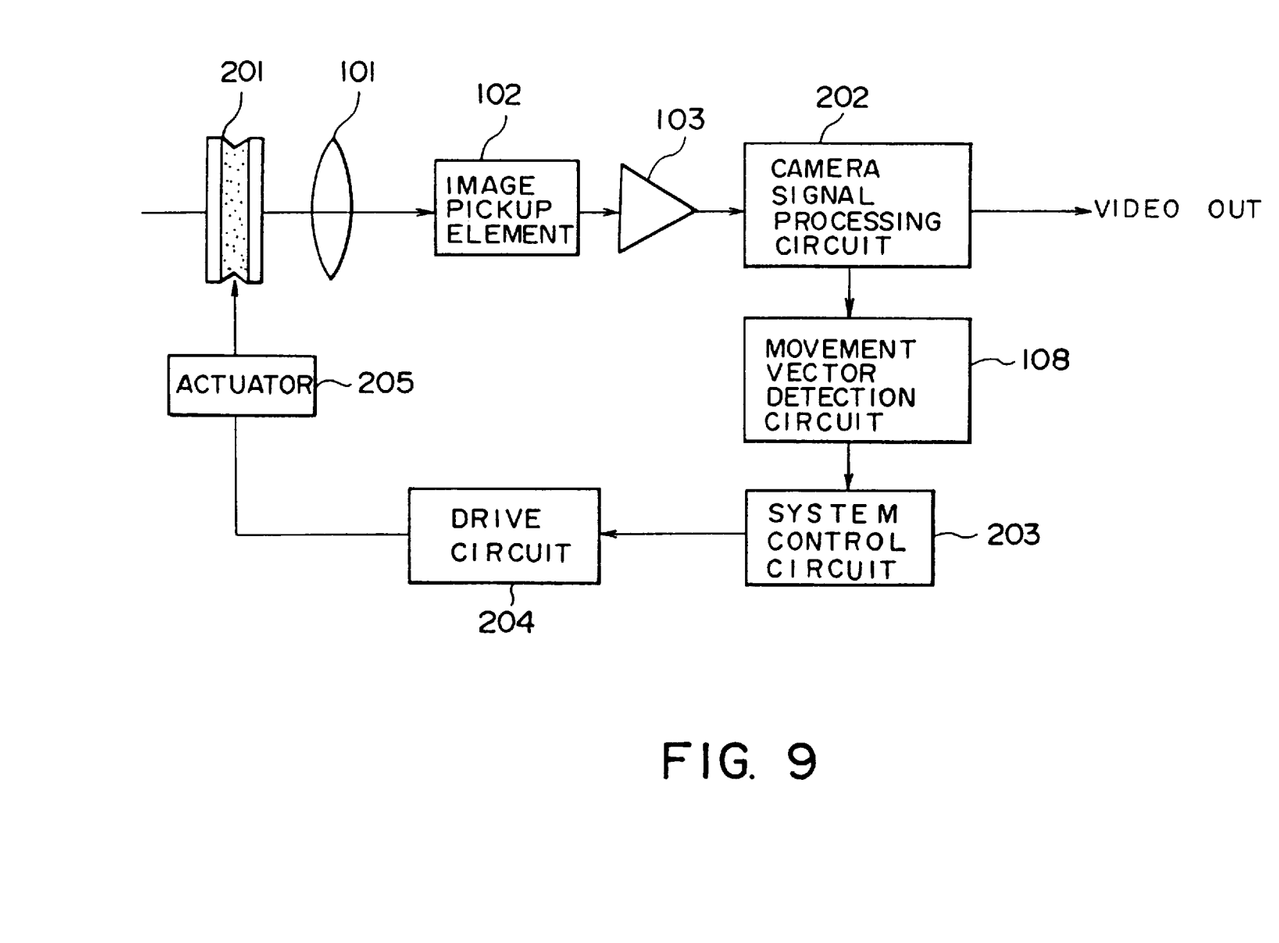
FIG. 9 is a block diagram to show the second example in which the movement detection apparatus of the present invention is applied to a vibration correction apparatus of a video camera.

FIG. 9 is a block diagram to illustrate another example of a video camera with a vibratory motion correction device using the movement vector detecting circuit of the present invention. The same components as in FIG. 8 have the same numbers, and are not explained further.

In FIG. 9, 201 is a variable vertical angle prism to correct a vibratory motion by varying the vertical angle or direction of the optical axis thereof. One example of the prism is an arrangement that silicone base liquid is sealed between two parallel glass plates to make variable the angle therebetween or vertical angle.

Number 202 is a camera signal processing circuit to output a normalized image signal converted from the output signal of the preamplifier, and 203 a system control circuit comprising a microcomputer to detect a direction and an amount of vibratory motion from the movement vector information supplied from the movement vector detecting circuit 108 and to compute an amount of driving of the variable vertical angle prism for the vibration correction. The correction information computed in the circuit 203 is supplied to the drive circuit 204, and an actuator 205 to vary the prism is driven in the direction and by the amount to kill the vibratory motion.

As in the above embodiments, the vibration correction is so that the vibration amount is computed by detecting the movement vector from the image signal, and further so that the variable vertical angle prism is driven in the direction to correct the amount of vibratory motion.

In either of the above embodiments, a movement vector operation region is suitably and automatically set in response to a spatial frequency of the input image. This allows the elimination of a great error vector even in an area of undistinguishable pattern, which, in turn, leads to high space resolution with effective use of the space gradient information of the image. The detection precision may increase by eliminating from the operation region the sign changing area of the space gradient as a spacing between the detection blocks, since the time space gradient method is not well applied therein. Therefore, the vibration correction may be attained with high precision and secure operation.

As detailed above, the movement detection apparatus of the present invention with a simple structure may detect the accurate movement amount from an image at a high speed, and may provide more than two to three times the detection range as the conventional methods.

We claim:

1. A video camera including:
    an image sensor for converting an image formed on an image sensing plane to an image signal;
    a filter for extracting a predetermined frequency signal from said image signal;
    a first operation circuit for detecting image movement and providing a movement vector, using said predetermined frequency signal output from said filter;
    a memory for storing a characteristic of a relationship between an actual movement of the image and the movement detected by said first operation circuit;
    a second operation circuit for correcting the movement vector, provided by the first operation circuit, using the characteristic stored in said memory; and
    a movement compensation device for compensating image movement on the basis of an output of said second operation circuit.

2. A camera according to claim 1, wherein said filter extracts from the image signal a spatial frequency component corresponding to a repeated pattern of an object image whose movement is to be detected.

3. A camera according to claim 2, wherein said memory stores a characteristic curve representative of a relationship between (i) a movement amount for said spatial frequency component, and (ii) a movement amount detected by said first operation circuit, and wherein said second operation circuit corrects a relationship between (i) the movement amount for said spatial frequency component and (ii) the movement amount detected by said first operation circuit by using information stored in said memory to obtain a linear relationship therebetween.

4. A camera according to claim 1, wherein said first operation circuit generates the movement vector from the image signal based on a temporal change of features of the image.

5. A camera according to claim 1, wherein said movement compensation device includes (i) an image memory for storing an image signal of at least picture, and (ii) a memory control circuit for controlling a read-out position of said image memory, and wherein said movement compensation device controls said memory control circuit to correct movement of the image by shifting a read-out position of said image memory toward a direction in which movement of the image is cancelled.

6. A camera according to claim 1, wherein said movement compensation device includes an optical movement correction system which shifts an input image optically, and wherein said movement compensation device corrects the movement of the image by moving said optical movement correction system according to an output of said second operation circuit toward a direction in which the movement of the image is cancelled.

7. A movement compensating apparatus comprising:
    receiving means for receiving an image signal;
    filter means for extracting a predetermined frequency signal from the image signal;
    vector detecting means for detecting a movement of the image and providing a movement vector, using said predetermined frequency signal output from said filter;
    memory means for storing a characteristic of a relationship between an actual movement of the image and the movement detected by said vector detecting means;
    operation means for correcting the movement vector provided by the vector detecting means, using the characteristic stored in the memory means; and
    a movement compensation device for compensating image movement on the basis of an output of said operation means.

8. Apparatus according to claim 7, wherein said filter means comprises a two-dimensional bandpass filter for extracting from the image signal a spatial frequency component corresponding to a repeated pattern of an object image whose movement is to be detected.

9. Apparatus according to claim 7, wherein said vector detecting means generates the movement vector from the image signal based on temporal change of features of the image.

10. Apparatus according to claim 9, wherein said vector detecting means detects from the image signal an edge portion of a luminance signal and provides the movement vector based on the temporal change of the detected edge portion.

11. Apparatus according to claim 9, wherein said memory means stores a characteristic curve representative of a relationship between (i) a movement amount of said spatial frequency signal, and (ii) a movement amount of the image detected by said vector detecting means, and wherein said operation means corrects a relationship between (i) the movement amount of said spatial frequency signal, and (ii) the movement amount of the image detected by said vector detecting means, by using information stored in said memory means to obtain a linear relationship therebetween.

12. Apparatus according to claim 7, wherein said movement compensation device includes (i) an image memory for storing an image signal of at least one picture, and (ii) a memory control circuit for controlling a read-out position of said image memory, and wherein said movement compensation device controls said memory control circuit to correct movement of the image by shifting a read-out position of said image memory according to an output of said operation means toward a direction in which the movement of the image is cancelled.

13. Apparatus according to claim 7, wherein said movement compensation devices includes an optical movement correction system for optically shifting an input image, and wherein said movement compensation device corrects the movement of the image by moving said optical movement correction system according to an output of said operation means toward a direction in which the movement of the image is to be cancelled.

* * * * *

UNITED STATES PATENT AND TRADEMARK OFFICE
CERTIFICATE OF CORRECTION

PATENT NO. : 5,861,916

DATED : January 19, 1999

INVENTOR(S) : MASAYOSHI SEKINE, ET AL.

It is certified that error appears in the above-identified patent and that said Letters Patent is hereby corrected as shown below:

COVER PAGE [56] RC,
Foreign Priority Documents, "1178916" should read
--1-178916--.

COLUMN 1,
Line 41, "a interframe" should read --an interframe--; and
Line 46, "big" should read --large--.

COLUMN 2,
Line 15, "U.S. Pat. No. 4788596" should read --U.S. Pat. No. --4,788,596--;
Line 19, "U.S. Pat. No. 5031049" should read --U.S. Pat. No. --5,031,049--; and
Line 56, "predetermined a" should read --a predetermined--.

COLUMN 3,
Line 29, "references" should read --reference--;
Line 48, "the" (second occurrence) should be deleted;
Line 49, "control" should read --control the--; and
Line 52, "circuit" should read --circuit 5--.

COLUMN 4,
Line 43, "circuit 8,9" should read --circuits 8, 9--.

UNITED STATES PATENT AND TRADEMARK OFFICE
CERTIFICATE OF CORRECTION

PATENT NO. : 5,861,916

DATED : January 19, 1999

INVENTOR(S) : MASAYOSHI SEKINE, ET AL.

Figure 4C:
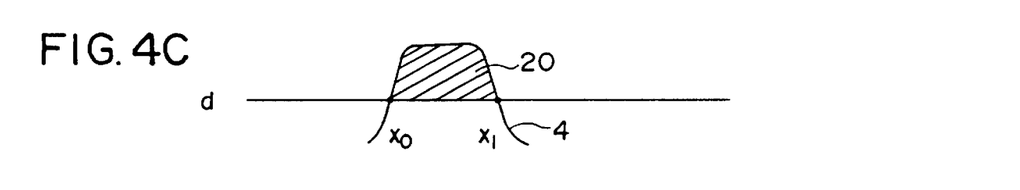
Figure 4D:
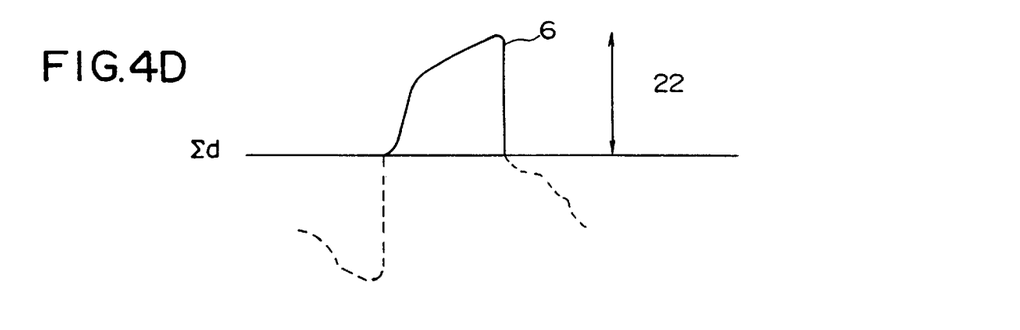

It is certified that error appears in the above-identified patent and that said Letters Patent is hereby corrected as shown below:

COLUMN 5,
Line 2, "FIG. C" should read --FIG. 4C--;
Line 36, "if" should read --when--; and
Line 56, "necessary" should read --the necessary--.

COLUMN 6,
Line 13, "Also" should read --Also,--;
Line 25, "a" (first occurrence) should be deleted; and
Line 45, "to; and" should read --to--.

COLUMN 7,
Line 10, "the direction" should read --a direction--; and
Line 33, "is" should read --is attained--.

COLUMN 8,
Line 27, "picture," should read --one picture--.

COLUMN 10,
Line 9, "devices" should read --device--.

Signed and Sealed this

Fourteenth Day of September, 1999

Attest:

Q. TODD DICKINSON

*Attesting Officer*   *Acting Commissioner of Patents and Trademarks*